(12) United States Patent
Cranna

(10) Patent No.: US 8,714,059 B2
(45) Date of Patent: May 6, 2014

(54) SAW BLADE WITH SINGLE LEVEL AND MULTIPLE LEVEL SET PATTERNS WITHIN PITCH PATTERNS, AND RELATED METHOD

(75) Inventor: Mark T. Cranna, Somers, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 602 days.

(21) Appl. No.: 12/844,777

(22) Filed: Jul. 27, 2010

(65) Prior Publication Data

US 2011/0179920 A1 Jul. 28, 2011

Related U.S. Application Data

(60) Provisional application No. 61/228,899, filed on Jul. 27, 2009.

(51) Int. Cl.
*B26D 1/00* (2006.01)
*B27B 33/02* (2006.01)

(52) U.S. Cl.
USPC ...................... 83/13; 83/851; 83/853; 83/661

(58) Field of Classification Search
USPC .......................................... 83/835–855, 661
See application file for complete search history.

(56) References Cited

U.S. PATENT DOCUMENTS

| | | | |
|---|---|---|---|
| 2,568,870 A * | 9/1951 | Ronan | 83/846 |
| 3,072,164 A | 1/1963 | Ramierez et al. | |
| 3,292,674 A | 12/1966 | Turner | |
| 4,179,967 A | 12/1979 | Clark | |
| 4,311,075 A | 1/1982 | Sundstrom | |
| RE31,433 E | 11/1983 | Clark | |
| 4,557,172 A | 12/1985 | Yoneda | |
| 4,658,689 A | 4/1987 | Yakich | |
| 4,727,788 A | 3/1988 | Yoshida et al. | |
| 4,813,324 A | 3/1989 | Yoshida et al. | |
| 4,827,822 A | 5/1989 | Yoshida et al. | |
| 4,958,546 A | 9/1990 | Yoshida et al. | |
| 5,410,935 A | 5/1995 | Holston et al. | |
| 5,425,296 A | 6/1995 | Kullmann et al. | |
| 5,477,763 A | 12/1995 | Kullman | |
| 5,603,252 A | 2/1997 | Hayden | |

(Continued)

FOREIGN PATENT DOCUMENTS

| | | |
|---|---|---|
| CN | 2310656 Y | 3/1999 |
| JP | 2006326823 A | 12/2006 |
| WO | WO-2005087421 A1 | 9/2005 |

OTHER PUBLICATIONS

International Search Report of PCT/US2010/043442 mailed Sep. 21, 2010.

(Continued)

*Primary Examiner* — Omar Flores Sanchez
(74) *Attorney, Agent, or Firm* — McCarter & English, LLP

(57) ABSTRACT

A band saw blade has a plurality of teeth defining a pitch pattern and first and second set patterns within each pitch pattern. The first set pattern includes a plurality of offset teeth that are each offset at approximately the same set magnitude as every other set tooth within the first set pattern. The second set pattern includes a plurality of first offset teeth that are each offset at approximately a first set magnitude, and a plurality of second set teeth that are each offset at approximately a second set magnitude that is greater than the first set magnitude.

21 Claims, 3 Drawing Sheets

(56) References Cited

U.S. PATENT DOCUMENTS

| | | | |
|---|---|---|---|
| 5,606,900 | A | 3/1997 | Stoddard |
| 5,832,803 | A | 11/1998 | Hayden |
| 6,003,422 | A | 12/1999 | Holston |
| 6,158,324 | A | 12/2000 | Kullmann et al. |
| 6,167,792 | B1 | 1/2001 | Korb et al. |
| 6,220,140 | B1 | 4/2001 | Hellebergh |
| 6,269,722 | B1 | 8/2001 | Hellbergh |
| 6,276,248 | B1 | 8/2001 | Cranna |
| 6,276,249 | B1 | 8/2001 | Handschuh et al. |
| 6,439,094 | B1 * | 8/2002 | Yoneda et al. ............... 83/835 |
| 6,520,722 | B2 | 2/2003 | Hopper et al. |
| 6,532,852 | B1 | 3/2003 | Tsujimoto et al. |
| 6,601,495 | B2 | 8/2003 | Cranna |
| 6,834,573 | B1 | 12/2004 | Nakahara |
| 7,036,415 | B2 | 5/2006 | Tsujimoto |
| 7,174,823 | B2 | 2/2007 | Cranna |
| 7,178,441 | B2 | 2/2007 | Hellbergh |
| 7,225,714 | B2 | 6/2007 | Rompels et al. |
| 7,913,601 | B2 * | 3/2011 | Petts et al. ............... 83/846 |
| D642,028 | S * | 7/2011 | Fosberg et al. ............... D8/20 |
| 8,113,100 | B1 * | 2/2012 | Cranna et al. ............... 83/851 |
| 8,210,081 | B2 * | 7/2012 | Elliston et al. ............... 83/835 |
| 2001/0004860 | A1 | 6/2001 | Kullmann et al. |
| 2002/0029679 | A1 * | 3/2002 | Cranna ............... 83/846 |
| 2003/0051593 | A1 | 3/2003 | Kocher et al. |
| 2003/0116006 | A1 | 6/2003 | Graf |
| 2004/0035282 | A1 | 2/2004 | Tsujimoto |
| 2004/0182218 | A1 | 9/2004 | Chao |
| 2004/0255749 | A1 | 12/2004 | Hayden |
| 2005/0257660 | A1 | 11/2005 | Hayden |
| 2006/0162526 | A1 | 7/2006 | Nagano et al. |
| 2007/0193427 | A1 | 8/2007 | Hayden |
| 2007/0199416 | A1 | 8/2007 | Cook et al. |
| 2007/0214922 | A1 | 9/2007 | Cook et al. |
| 2007/0251372 | A1 | 11/2007 | Petts |
| 2008/0121079 | A1 | 5/2008 | Hashimoto et al. |
| 2008/0307936 | A1 | 12/2008 | Elliston et al. |
| 2009/0007437 | A1 | 1/2009 | Tokiwa |
| 2009/0013847 | A1 * | 1/2009 | Lauzet ............... 83/846 |

OTHER PUBLICATIONS

Written Opinion of the ISA of PCT/US2010/043442 mailed Sep. 21, 2010.
International Preliminary Report on Patentability for International Application No. PCT/US2010/043442, mailed Feb. 9, 2012.

* cited by examiner

| TOOTH # | PITCH (P12-P26) | C2° | (R1) | R2 | (RF) |
|---|---|---|---|---|---|
| 12 | .506 | 37 | .161 | .113 | .052 |
| 14 | .458 | 37 | .133 | .098 | .052 |
| 16 | .410 | 40 | .127 | .085 | .050 |
| 18 | .386 | 40 | .113 | .077 | .051 |
| 20 | .342 | 40 | .065 | .068 | .045 |
| 22 | .362 | 40 | .091 | .070 | .050 |
| 24 | .362 | 40 | .117 | .070 | .050 |
| 26 | .434 | 37 | .145 | .091 | .051 |

SAW BLADE WITH SINGLE LEVEL AND MULTIPLE LEVEL SET PATTERNS WITHIN PITCH PATTERNS, AND RELATED METHOD

CROSS-REFERENCE TO PRIORITY APPLICATION

This patent application claims priority on U.S. Provisional Patent Application Ser. No. 61/228,899 filed Jul. 27, 2009, entitled "Saw Blade With Single Level And Multiple Level Set Patterns Within Pitch Patterns, And Related Method", which is hereby incorporated by reference in its entirety as part of the present disclosure.

FIELD OF THE INVENTION

The present invention relates to saw blades, such as band saw blades, and more particularly, relates to saw blades having set patterns within pitch patterns and related methods.

BACKGROUND INFORMATION

In certain marketplaces, such as the Asia marketplace, end users are known to attempt to cut relatively large cross-sections of material on under-powered saws outfitted with relatively narrow width/fine pitch blades. Using traditional single level (SL) set blade designs (where all set teeth are bent to the same relative position to the blade body), the chips formed will be relatively thin and wide. As a result of the increased energy required to create thin, wide chips, the SL saw blade typically has trouble penetrating the work piece leading to increased noise and vibration and overall poor blade life.

In an effort to overcome these issues related to SL set product, 5 tooth variable-level (VL) set designs were created to produce chips that are relatively narrow in comparison. The narrower, deeper chips provide for better tooth penetration but at the expense of key end user requirements such as reduced noise and smoothness of cut surface.

Accordingly, it is an object of the present invention to overcome one or more of the above-described drawbacks and/or disadvantages of the prior art.

SUMMARY OF THE INVENTION

In accordance with a first aspect, the present invention is directed to a saw blade comprising a plurality of teeth defining a pitch pattern and first and second set patterns within each pitch pattern. The first set pattern includes a plurality of offset teeth that are each offset at approximately the same set magnitude as every other set tooth within the first set pattern. The second set pattern includes a plurality of first offset teeth that are each offset at approximately a first set magnitude, and a plurality of second set teeth that are each offset at approximately a second set magnitude that is greater than the first set magnitude.

In some embodiments of the present invention, each set pattern includes an unset leading tooth and a plurality of offset trailing teeth. The offset trailing teeth are alternately offset in opposite directions relative to each other. In some such embodiments, the saw blade is a band saw blade.

In some embodiments of the present invention, each tooth defines a respective pitch/set structure, and every tooth defines a different pitch/set structure than every other tooth in the respective set pattern. In some such embodiments, some teeth in the pitch pattern have the same pitch but a different set, and other teeth in the pitch pattern have the same set but a different pitch. Preferably, every tooth defines a different pitch/set structure than every other tooth in the respective pitch pattern.

In one embodiment, the blade defines a 3/5 set pattern, wherein the three tooth set pattern is a single level set pattern, and the five tooth set pattern of each pitch pattern is a multiple level set pattern. In another embodiment, the blade defines a 5/5 set pattern, wherein one five tooth set pattern is a single level set pattern, and the other five tooth set pattern of each pitch pattern is a multiple level set pattern.

In some embodiments of the present invention, the first set pattern defines a single level set including an unset leading tooth, a right relatively heavy set tooth and a left relatively heavy set tooth, and the second set pattern defines a multiple level set including an unset leading tooth, a right relatively light set tooth, a left relatively heavy set tooth, a right relatively heavy set tooth and a left relatively light set tooth. In some such embodiments, the first set pattern includes the following teeth in the following order without any additional teeth therebetween: an unset leading tooth, a right relatively heavy set tooth and a left relatively heavy set tooth. In some embodiments of the present invention, the second set pattern includes the following teeth in the following order without any additional teeth therebetween: an unset leading tooth, a right relatively light set tooth, a left relatively heavy set tooth, a right relatively heavy set tooth and a left relatively light set tooth. In some such embodiments, each light set tooth is set to approximately the same set magnitude as every other light set tooth, and each heavy set tooth is set to approximately the same set magnitude as every other heavy set tooth. In some embodiments of the present invention, the first set pattern includes the following teeth in the following order without any additional teeth therebetween: an unset leading tooth, a right relatively heavy set tooth, a left relatively heavy set tooth, a right relatively heavy set tooth, and a left relatively heavy set tooth. In some such embodiments, the second set pattern includes the following teeth in the following order without any additional teeth therebetween: an unset leading tooth, a right relatively light set tooth, a left relatively heavy set tooth, a right relatively heavy set tooth and a left relatively light set tooth.

In accordance with another aspect, the present invention is directed to a saw blade, such as a band saw blade, including set patterns within pitch patterns, wherein one set pattern of each pitch pattern is a single level set and the other set pattern of each pitch pattern is a multiple level set.

In some embodiments of the present invention, the single level set pattern includes a first unset leading tooth, and trailing relatively heavy set teeth, and the multiple level set pattern includes an unset leading tooth, trailing relatively light set teeth and trailing relatively heavy set teeth. In some such embodiments, the multiple level set pattern includes two consecutively disposed, alternately set, relatively heavy set teeth, and two alternatively set, relatively light set teeth located on either side of the two relatively heavy set teeth.

In accordance with another aspect, the present invention is directed to a method comprising the following steps:

(i) mounting a band saw blade on a band saw, wherein the band saw blade includes set patterns within pitch patterns, one set pattern of each pitch pattern is a single level set and the other set pattern of each pitch pattern is a multiple level set, and the band saw has a power within the range of about either 1 kW to about 8 kW or about 1⅓ HP to about 10½ HP; and (ii) cutting at least one work piece having an effective cutting length within the range of about 150 mm to about 1000 mm, or within the range of about 6 inches to about 40 inches, with the band saw blade mounted in the band saw.

In some embodiments of the present invention, the work pieces are metal work pieces; and the band saw blade defines a width within the range of about 27 mm or about 1 inch to about 54 mm or about 2 inch, and defines a pitch within the range of about 4/6 to about 1.4/2.0.

One of the advantage of the saw blades and method of the present invention is that they allow for relatively high efficiency, low noise saw blades with progressive tooth engagement.

Other objects and advantages of the present invention, and/or of the currently preferred embodiments thereof, will become more readily apparent in view of the following detailed description of the currently preferred embodiments and accompanying drawings.

DETAILED DESCRIPTION OF CURRENTLY PREFERRED EMBODIMENTS

Figures 1, 1A:
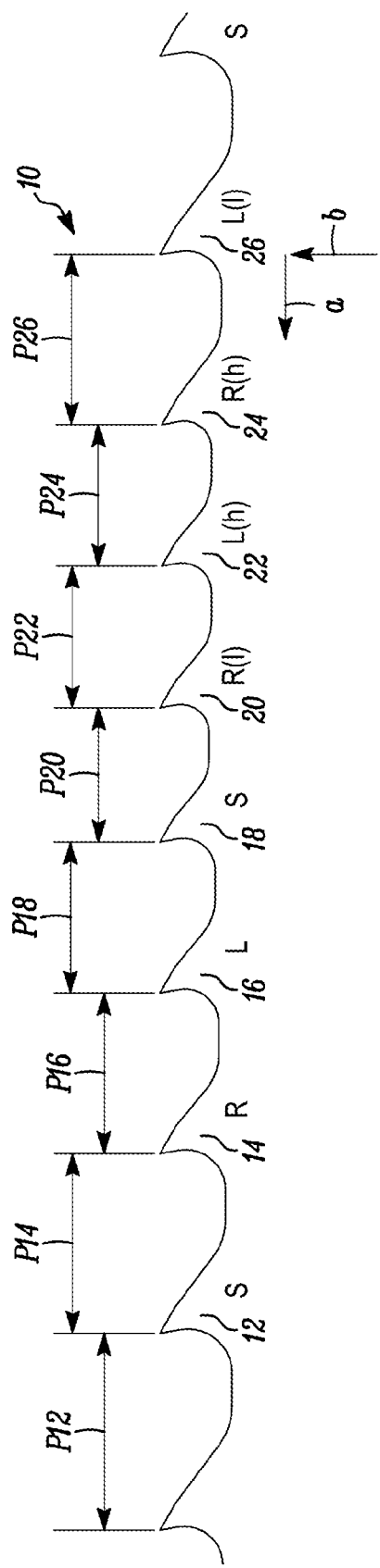
FIG. 1 is a partial, side elevational view of a band saw blade embodying the present invention.
FIG. 1A is a table illustrating the pitch and tooth dimensions of the saw blade of FIG. 1.

In FIG. 1, a band saw blade embodying the present invention is indicated generally by the reference numeral 10. The band saw blade 10 defines a cutting direction indicated by the arrow "a", and a feed direction indicated by the arrow "b". The band saw blade 10 comprises a plurality of recurrent or repetitive patterns of teeth defining an eight tooth pitch pattern. Each pitch pattern is defined by a recurrent group of eight successive teeth indicated by the reference numerals 12, 14, 16, 18, 20, 22, 24 and 26. As shown in FIG. 1, each tooth defines a respective pitch or tooth spacing P12 through P26. In the preferred embodiments of the present invention, and as indicated in FIG. 1, the pitch or tooth spacing is measured between the tips of adjacent teeth. However, as may be recognized by those skilled in the pertinent art based on the teachings herein, the pitch or tooth spacing may be measured between any of numerous other corresponding points between adjacent teeth.

Figure 3:
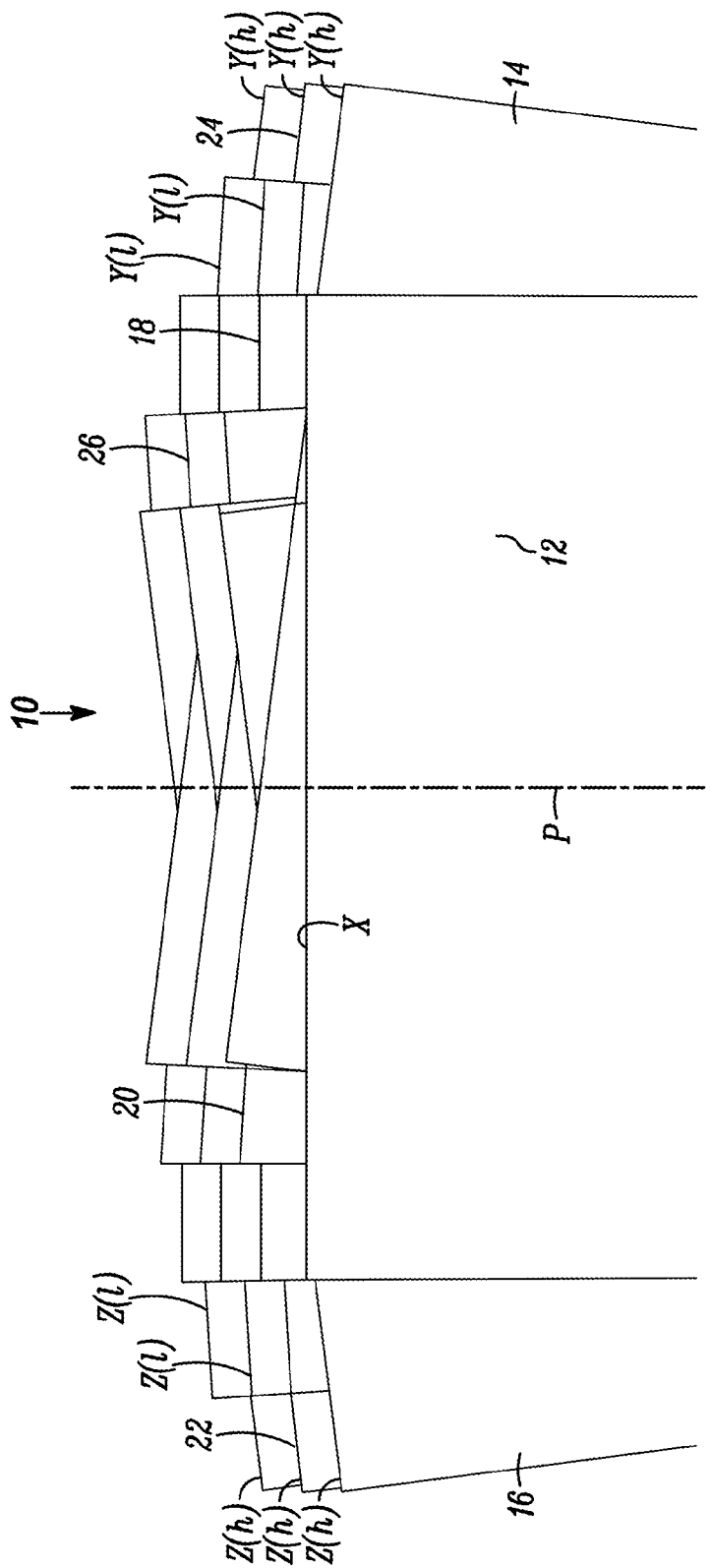
FIG. 3 is a somewhat schematic, partial, cross-sectional view of the band saw blade of FIG. 1.

Each eight tooth pitch pattern of the band saw blade 10 defines a two-tier (multi-level) three/five set pattern as follows:

S-R(H)-L(H)-S-R(l)-L(h)-R(h)-L(l)-S . . . , where,
S=Raker=Neutral Set=Nominal Tooth Tip Plane;
R(H)=Right and Heavy Set=Nominal Tooth Tip Plane;
L(H)=Left and Heavy Set=Nominal Tooth Tip Plane;
S=Raker=Neutral Set=Nominal Tooth Tip Plane;
R(l)=Right and Light Set=Nominal Tooth Tip Plane;
L(h)=Left and Heavy Set=Maximum Tooth Tip Drop;
R(h)=Right and Heavy Set=Maximum Tooth Tip Drop; and
L(l)=Left and Light Set=Nominal Tooth Tip Plane Thus, in the illustrated embodiment of FIG. 1, the first set pattern is defined by the three successive teeth 12, 14 and 16, and the second set pattern is defined by the next five successive teeth 18, 20, 22, 24 and 26. As shown in FIGS. 1 and 3, the first set pattern is defined by a first unset (S) leading tooth 12, a primary right set (R) trailing tooth 14, and a primary left set (L) trailing tooth 16. The second set pattern is defined by a first unset (S) leading tooth 18, a primary light right set (R(l)) trailing tooth 20, a primary heavy left set (L(h)) trailing tooth 22, a secondary right heavy set (R(h)) trailing tooth 24, and a secondary left light set (L(l)) trailing tooth 26. As shown in FIG. 3, each unset leading tooth 12 and 18 is symmetrical about the plane of symmetry "p" of the band saw blade 10, and defines a cutting edge substantially located within a cutting plane "x" which is approximately perpendicular to the plane of symmetry "p". Each heavy right set (R(h)) trailing tooth 14 and 24 is tilted or set to the right in the drawing relative to the plane of symmetry "p" (when viewed from the cutting direction "a" of the saw blade) by a first or heavy set magnitude, and defines a cutting edge substantially located within a cutting plane "y(h)" tilted or set at a first or heavy acute angle relative to the plane of symmetry "p". Each light right set (R(l)) trailing tooth 20 is tilted or set to the right in the drawing relative to the plane of symmetry "p" (when viewed from the cutting direction "a" of the saw blade) by a second or light set magnitude that is less than the first or heavy set magnitude, and defines a cutting edge substantially located within a cutting plane "y(l)" tilted or set at a second or light acute angle relative to the plane of symmetry "p". As can be seen, the second or light acute angles are less than the first or heavy acute angles. Similarly, each heavy left set (L(h)) trailing tooth 16 and 22 is tilted or set to the left in the drawing relative to the plane of symmetry "p", and defines a cutting edge substantially located within a cutting plane "z(h)" tilted or set at a first or heavy acute angle relative to the plane of symmetry "p". Each light left set (L(l)) trailing tooth 26 is tilted or set to the left in the drawing relative to the plane of symmetry "p" at a second or light set magnitude that is less than the first or heavy set magnitude, and defines a cutting edge substantially located within a cutting plane "z(l)" tilted or set at a light acute angle relative to the plane of symmetry "p". As can be seen, the second or light acute angles are less than the first or heavy acute angles. As can be seen in FIG. 3, in the first set pattern (teeth 12, 14 and 16) the set teeth define the same set magnitude and thus define a "single level" set pattern (i.e., heavy set teeth only). In the second set pattern (teeth 18-26), on the other hand, the set teeth define a "multiple level" set pattern (i.e., both heavy set and light set teeth) wherein the light set teeth lead and trail (i.e., are located in front of and follow, or are located on either side of) the consecutive heavy set teeth. As also shown, each heavy set tooth defines a maximum tooth tip drop relative to the unset tooth cutting plane x. Accordingly, the currently preferred embodiment is a single-level, variable-level ("SLVL") design.

Figure 2:
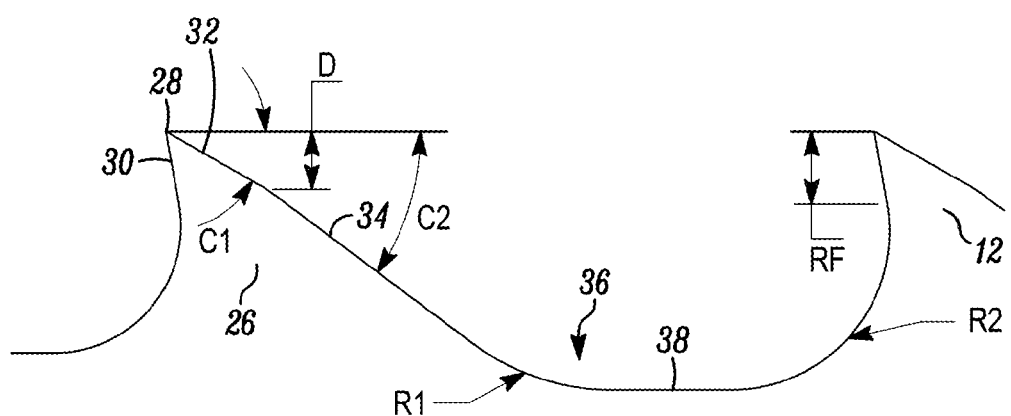
FIG. 2 is a partial, enlarged, side elevational view of exemplary teeth of the band saw blade of FIG. 1.

As shown typically in FIG. 2, each tooth defines a tip 28, a rake face 30 located on one side of the tip, a primary clearance surface 32 located on an opposite side of the tip relative to the rake face, a secondary clearance surface 34 located on an opposite side of the primary clearance surface relative to the tip, and a gullet 36 extending between the secondary clearance surface and the rake face. Each primary clearance surface 32 defines a first clearance angle C1, and each secondary clearance surface 34 defines a secondary clearance angle C2. Each clearance angle is an acute angle, and the secondary clearance angle C2 is greater than the first clearance angle C1. The secondary clearance surface 34 starts at a depth D below the tip 28. In the illustrated embodiment, the depth D is about 0.04 inch. Each rake face 30 defines a depth "RF" from the tip 28. As can be seen, in the illustrated embodiment, the clearance angles C1 and C2, the depth D of the secondary clearance surface C2, and the rake face depth RF, are measured with respect to a plane extending between the tips of unset teeth (or a "tooth tip" reference plane). Each gullet 36 is defined by a first gullet radius R1 extending between the secondary clearance surface 34 and the gullet base, a substantially flat gullet base 38, and a second gullet radius R2 extending between the gullet base and the rake face 30. FIG. 1A illustrates exemplary dimensions for the Pitch, secondary clearance angle C2, first gullet radius R1, second gullet radius R2 and rake face depth RF of each tooth 12-26 of each pitch pattern. Each dimension is in inches unless otherwise indicated. In the illustrated embodiment, the primary clearance angle C1 is approximately the same for each tooth, and in the illustrated embodiment is about 30°. As may be recognized by those of ordinary skill in the pertinent art based on the teachings herein, the illustrated dimensions of the teeth may take any of numerous different dimensions, and the teeth may include the same and/or any of numerous other features, that are currently known or that later become known.

The currently preferred embodiment of the saw blade 10 is a band saw blade defining a blade width of about 1½ inches, a blade thickness of about 0.050 inch, and a ⅔ pitch, that operates at a band speed of about 150 FPM (feet per minute), and at an average feed penetration per tooth of about 0.00025 inch. The currently preferred band saw blade embodiments of the present advantage are particularly suited for cutting metal work pieces (either single work pieces or bundles of work pieces) that define effective cutting lengths (or effective thicknesses) within the range of about 150 mm or about 6 inches to about 1000 mm or about 40 inches; on band saws that operate at low to moderate power levels within the range of about 1 kilowatt or about 1⅓ horsepower to about 8 kilowatts or about 10½ horsepower; that define blade widths within the range of about 27 mm or about 1 inch to about 54 mm or about 2 inch; and that define pitches within the range of about ⅘ to about 1.4/2. As may be recognized by those of ordinary skill in the pertinent art based on the teachings herein, these numbers or values are only exemplary, and may take any of numerous other numbers are values that are currently known, or that later become known.

During the initial cutting sequence, the 3/5 SLVL design of the blade 10 allows for freer cutting due to the primary engagement of all teeth except the L(h) and R(h) teeth (22, 24). These teeth (22, 24) are initially employed to perform only the critical step of re-qualifying the outer kerf walls and providing additional lateral blade stability. In general, this 3/5 SLVL blade 10 will act as a uniformly loaded, coarser pitch blade and can take better advantage of a saw with limited feed force per tooth in comparison to prior art blades. In addition, this blade will have better beam strength properties in comparison to an "equivalent" traditional coarser pitch blade encountered in the prior art.

As the 3/5 VLSL blade 10 reaches a critical wear threshold, the primary cutting facets of the L(h) and R(h) teeth (22, 24) start engaging the material thereby providing cutting load support to the L(H, 1) (16, 26) and R(H, 1) (14, 20) teeth. At this stage, the entire 8 tooth varied pitch sequence is engaged to provide maximum noise/vibration reduction. In addition, while maintaining the same optimal, narrow chip formation, the blade will have about 25% more teeth engaged to re-qualify the kerf walls to achieve superior surface finish to a traditional 5 tooth variable-load product as encountered in the prior art.

In the illustrated embodiment, each tooth defines a different pitch/set structure than every other tooth within the respective set pattern, and preferably, defines a different pitch/set structure than every other tooth within the respective pitch pattern. As can be seen, every tooth within the 8 tooth pitch pattern defines a different pitch than almost every other tooth in the pitch pattern. The only teeth defining the same pitch are the two consecutive L(H) and R(H) teeth 22 and 24, respectively. However, these teeth define different set configurations, and thus these two teeth define different pitch/set configurations. One of the advantages of this feature is that during cutting operations, each tooth entering or exiting the work piece generates a different forcing frequency (due to the different pitch/set configuration) than every other tooth simultaneously entering or exiting the work piece, or the other teeth successively entering or exiting the work piece, thus substantially reducing noise and vibration during cutting operations, and facilitating blade break in. Thus, by providing each tooth within the pitch pattern with a different pitch/set structure, each tooth will generate a different forcing frequency upon cutting a work piece. For relatively small work pieces, each tooth may define a different pitch/set structure than every other tooth within the respective set pattern, but not every other tooth in the respective pitch pattern, and still achieve the function of having each tooth entering or exiting the work piece during cutting operations generate a different forcing frequency (f) than every other tooth simultaneously entering or exiting the work piece, and/or successively entering or exiting the work piece. However, in order to be sure that this function is achieved with respect to most, if not all work pieces, every tooth preferably defines a different pitch/set structure than every other tooth within the respective pitch pattern as illustrated, for example, in the table of FIG. 1A.

As indicated above, the pitch of each tooth is the distance in the elongated direction of the saw blade between corresponding points of the respective tooth and the preceding tooth in the cutting direction of the saw blade. Thus, as shown in FIG. 1, the pitch may be measured between the tips of adjacent teeth. The accumulated pitch of a tooth, on the other hand, is the sum of the pitch distances between the respective tooth and the nearest preceding tooth of the same or like set direction in the cutting direction of the saw blade. Thus, for example, with reference to FIG. 1, the accumulated pitch of the unset leading tooth 18 is the sum of the pitch distances P14, P16 and P18, i.e., the sum of the pitch distances between the unset leading tooth 18 and the nearest preceding unset leading tooth (12) in the cutting direction "a" of the saw blade. If desired, the ratio of pitch to accumulated pitch for each tooth of like set direction within each set pattern may increase from one tooth to the next in the direction opposite the cutting direction of the saw blade for distributing the chip load over the teeth of the saw blade. In this configuration, the ratio of pitch to accumulated pitch is greater for each secondary tooth than for the corresponding primary tooth, is greater for each tertiary tooth than for the corresponding secondary and primary teeth, and so on.

In another embodiment of the present invention, the blade defines a 10 tooth pitch pattern with two 5 tooth set patterns, wherein the first set pattern defines a single level set, and the second set pattern defines a multiple level set, as follows: S-R-L-R-L-S-R(l)-L(h)-R(h)-L(l). In this embodiment, other than having a 5 tooth single level set pattern, all other features may be the same as set forth above in connection with the blade 10.

The currently preferred embodiments of the band saw blades of the present invention provide the following advantages:

Increased Blade Life
The combination of S-R-L and S-R(l)-L(h)-R(h)-L(l) sequences (or the S-R-L-R-L and S-R(l)-L(h)-R(h)-L(l) sequences, for example) allows for easier penetration of larger cross-sections with additional critical "support teeth" engaged for the outer cutting region.

Improved Surface Finish

The addition of the S-R-L pattern (or the S-R-L-R-L pattern, for example) to the traditional 5 tooth variable-load blade allows for the kerf walls to be re-qualified approximately 25% more often with less haphazard loading due to noise/vibration.

Lower Cutting Noise

Increasing the number of unique pitch sequences and set engagement strategies helps vary the forcing frequencies thereby reducing cutting noise.

As may be recognized by those of ordinary skill in the pertinent art based on the teachings herein, numerous changes and modifications may be made to the above-described and other embodiments of the present invention without departing from its scope as defined in the appended claims. For example, the geometry of the teeth may take any of numerous different shapes and/or dimensions other than those disclosed herein. Similarly, the teeth may take any of numerous different sets, pitches, set patterns, and/or pitch patterns other than those disclosed herein. The blades may be any of numerous different types of band saw blades, or other types of saw blades, for cutting any of numerous different types of materials and/or work pieces, that are currently known, or that later become known. Accordingly, this detailed description of preferred embodiments is to be taken in an illustrative as opposed to a limiting sense.

What is claimed is:

1. A method comprising the following steps:
mounting a band saw blade on a band saw, wherein the band saw blade includes set patterns within pitch patterns, one set pattern of each pitch pattern is a single level set including a first unset leading tooth and trailing relatively heavy set teeth, and the other set pattern of each pitch pattern is a multiple level set including an unset leading tooth, two consecutively disposed, alternatively set, trailing relatively heavy set teeth, and two alternatively set, relatively light set trailing teeth located on either side of the two relatively heavy set teeth, and the band saw has a power within the range of about either 1 kW to about 8 kW or about 1⅓ HP to about 10½ HP; and
cutting at least one work piece having an effective cutting length within the range of about 150 mm to about 1000 mm, or within the range of about 6 inches to about 40 inches, with the band saw blade mounted in the band saw.

2. A method as defined in claim 1, wherein the work pieces are metal work pieces.

3. A method as defined in claim 1, wherein the band saw blade defines a width within the range of about 27 mm or about 1 inch to about 54 mm or about 2 inch, and defines a pitch within the range of about 4/6 to about 1.4/2.

4. A saw blade comprising a plurality of teeth defining a pitch pattern and first and second set patterns within each pitch pattern, wherein:
the first set pattern includes a plurality of offset teeth that are each offset at approximately the same set magnitude as every other set tooth within the first set pattern and defines a single level set including an unset leading tooth, a right relatively heavy set tooth and a left relatively heavy set tooth, and
the second set pattern includes a plurality of first offset teeth that are each offset at approximately a first set magnitude, and a plurality of second set teeth that are each offset at approximately a second set magnitude that is greater than the first set magnitude and defines a multiple level set including an unset leading tooth, a right relatively light set tooth, a left relatively heavy set tooth, a right relatively heavy set tooth and a left relatively light set tooth.

5. A saw blade as defined in claim 4, wherein each set pattern includes an unset leading tooth and a plurality of offset trailing teeth.

6. A saw blade as defined in claim 5, wherein the offset trailing teeth are alternately offset in opposite directions relative to each other.

7. A saw blade as defined in claim 4, wherein the saw blade is a band saw blade.

8. A saw blade as defined in claim 4, wherein each tooth defines a respective pitch/set structure, and every tooth defines a different pitch/set structure than every other tooth in the respective set pattern.

9. A saw blade as defined in claim 8, wherein some teeth in each pitch pattern have the same pitch but a different set, and other teeth in each pitch pattern have the same set but a different pitch.

10. A saw blade as defined in claim 9, where every tooth defines a different pitch/set structure than every other tooth in the respective pitch pattern.

11. A saw blade as defined in claim 4, wherein the blade defines a 3/5 set pattern.

12. A saw blade as defined in claim 11, wherein the three tooth set pattern is a single level set pattern, and the five tooth set pattern of the pitch pattern is a multiple level set pattern.

13. A saw blade as defined in claim 4, wherein the blade defines a 5/5 set pattern.

14. A saw blade as defined in claim 13, wherein one five tooth set pattern is a single level set pattern, and the other five tooth set pattern of each pitch pattern is a multiple level set pattern.

15. A saw blade as defined in claim 4, wherein the first set pattern includes the following teeth in the following order without any additional teeth therebetween: an unset leading tooth, a right relatively heavy set tooth and a left relatively heavy set tooth.

16. A saw blade as defined in claim 14, wherein the second set pattern includes the following teeth in the following order without any additional teeth therebetween: an unset leading tooth, a right relatively light set tooth, a left relatively heavy set tooth, a right relatively heavy set tooth and a left relatively light set tooth.

17. A saw blade as defined in claim 16, wherein each light set tooth is set to approximately the same set magnitude as every other light set tooth, and each heavy set tooth is set to approximately the same set magnitude as every other heavy set tooth.

18. A saw blade as defined in claim 15, wherein the first set pattern includes the following teeth in the following order without any additional teeth therebetween: an unset leading tooth, a right relatively heavy set tooth, a left relatively heavy set tooth, a right relatively heavy set tooth, and a left relatively heavy set tooth.

19. A saw blade as defined in claim 18, wherein the second set pattern includes the following teeth in the following order without any additional teeth therebetween: an unset leading tooth, a right relatively light set tooth, a left relatively heavy set tooth, a right relatively heavy set tooth and a left relatively light set tooth.

20. A band saw blade including set patterns within pitch patterns, wherein one set pattern of each pitch pattern is a single level set including a first unset leading tooth and trailing relatively heavy set teeth, and the other set pattern of each pitch pattern is a multiple level set including an unset leading tooth, two consecutively disposed, alternatively set, trailing relatively heavy set teeth, and two alternatively set, relatively light set trailing teeth located on either side of the two relatively heavy set teeth.

21. A band saw blade as defined in claim 20, wherein the set pattern is one of a 3/5 set pattern and a 5/5 set pattern.

* * * * *